UNITED STATES PATENT OFFICE.

VINCEN P. McVOY, OF PENSACOLA, FLORIDA, ASSIGNOR TO JAMES W. WADE, OF MOBILE, ALABAMA.

PROCESS OF EXTRACTING SAP.

No. 832,405.     Specification of Letters Patent.     Patented Oct. 2, 1906.

Application filed July 3, 1906. Serial No. 324,622.

*To all whom it may concern:*

Be it known that I, VINCEN P. McVOY, of Pensacola, in the county of Escambia and State of Florida, have invented certain new and useful Improvements in Processes of Extracting Sap; and I do hereby declare the following to be a full, clear, and exact description of the invention, such as will enable others skilled in the art to which it appertains to make and use the same.

The object of this invention is to provide a process for quickly and economically effecting the extraction of sap from trees.

According to my invention, I bore in a tree one or more holes of any desired depth or size, and the outer end of such bore is sealed, preferably by securing thereto a spout for conveying the sap to a bucket or other receptacle hermetically joined to the free end thereof. The air is then exhausted from the bore, spout, and cup by any suitable means or in any desired way, so as to create a vacuum within the bore, the spout, and the cup. The creation of the vacuum greatly facilitates the extraction of sap from the tree and the passage thereof into the collector. If desired, one or more additional bores may also be formed in the tree at an angle to and communicating with the bore to which the spout is secured, so as to facilitate the flow of sap into the main bore from a greater number of the pores and secure a more rapid extraction.

An apparatus for carrying out my process is shown and described in my pending application for patent, Serial No. 319,890, filed June 2, 1906.

I claim as my invention—

1. The herein-described process of extracting sap consisting in creating a vacuum within a tree at one or more collective points.

2. The herein-described process of extracting sap consisting in creating a vacuum within a laterally-extended bore or bores formed in a tree.

3. The herein-described process of extracting sap consisting in forming a bore in a tree, sealing the outer end thereof, and creating a vacuum within such bore.

4. The herein-described process of extracting sap consisting in forming a main bore in a tree, and also other bores extending therefrom and communicating therewith, sealing the outer end of the main bore, and creating a vacuum within all the bores.

In testimony whereof I have signed this specification in the presence of two subscribing witnesses.

VINCEN P. McVOY.

Witnesses:
     FRANCIS S. MAGUIRE,
     J. NOTA McGILL.